Patented Jan. 9, 1940

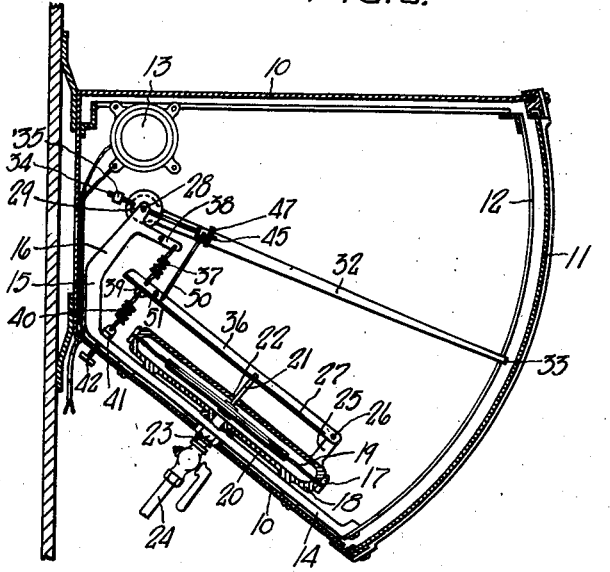

2,186,553

UNITED STATES PATENT OFFICE 2,186,553

CALIBRATION ADJUSTING MEANS

Hans Linde and Arnold Soller, Michigan City, Ind.

Application October 12, 1936, Serial No. 105,279

4 Claims. (Cl. 73—110)

This invention relates to calibration adjusting means, and particularly to means for adjusting the calibration of the pointed or recording arms or similar members of any instrument, gauge, meter or the like which employs a pivoted or shiftable member of this character.

The primary object of the invention is to provide means for calibrating the indicating mechanism of an instrument in the nature of resilient members acting upon opposite sides of a movable part of said mechanism and exerting opposed stresses thereon in substantially the normal plane of movement thereof.

A further object is to provide means for adjusting the calibration of a shiftable member comprising resilient members applying opposed stresses to said shiftable member, and a single member associated therewith for adjusting the tension of both resilient members and thereby adjusting the position of the shiftable member.

A further object is to provide means for adjusting the calibration of the indicator mechanism of an instrument, comprising resilient members exerting opposed stresses on said mechanism and adjustable to approximate accuracy, and means for adjusting said indicator mechanism independently of said resilient members for complete accuracy.

A further object is to provide adjusting means for effecting small adjustments of the indicator of an instrument independently of and relative to the actuating means thereof.

Other objects will be apparent from the description and the appended claims.

In the drawing:

Fig. 1 is a view of a combination draft and pressure gauge in front elevation.

Fig. 2 is a vertical longitudinal sectional view taken on line 22 of Fig. 1, with certain additional parts being shown in section.

Fig. 3 is a fragmentary enlarged side view of the calibration adjusting means with parts shown in section.

Fig. 4 is a fragmentary transverse vertical sectional view taken on line 4—4 of Fig. 3.

Fig. 5 is a fragmentary top plan view of the calibration adjusting means viewed in the direction of the arrow A in Fig. 3.

Fig. 6 is a longitudinal sectional view of a detail of the secondary adjusting means.

Referring to the drawing which illustrates one embodiment of the invention as applied to a combination draft and pressure gauge by way of illustration, the numeral 10 designates a housing having a sight opening in one face thereof closed by a transparent member 11. Behind this transparent member 11 a scale 12 of any suitable type is mounted in the housing, there preferably being a space provided between one side edge of the scale and the adjacent side wall of the housing as illustrated in Fig. 2, for purposes to be hereinafter set forth. The scale 12 may be translucent whereby a suitable light source 13 will facilitate reading thereof.

Within the housing 10, and preferably at the bottom thereof, is fixedly mounted a frame 14 which is provided with an angularly upwardly extending portion 15 at the end thereof adjacent the rear wall of the housing and which terminates in spaced angularly upwardly directed arms 16. On the frame 14 is mounted the casing of any suitable or desired instrument operating member 17. As shown here for purposes of illustration, the operating member 17 comprises a two-part casing 18 which mounts a slack leather or other suitable diaphragm 19 therebetween. To the opposite sides of the central portion of diaphragm 19 are secured rigid plates 20 which fixedly carry a perpendicularly extending rod 21 which passes through an opening 22 in one part of casing 18. The opening 22 is sufficiently large to open one side of the casing 18 to atmosphere and to accommodate lateral play of rod 21 under certain operating conditions. A suitable connection 23 is provided in the part of casing 18 opposite that in which opening 22 is formed, and this connection mounts one end of a conduit or tube 24 which is adapted for insertion in the chimney or draft line, or for connection with a pressure source to be tested. Thus the chambers of casing 18 on opposite sides of the diaphragm are respectively open to atmosphere and in communication with the member to be tested, but said opposed chambers are sealed from each other by the diaphragm.

In spaced relation to the opening 22 of casing 18 and adjacent the end of said casing opposite the frame portion 15, a standard 25 is fixedly carried by said casing. This standard pivotally mounts, at 26, the forward end of an elongated rigid lever 27. Journaled in the upper ends of frame arms 16 is a shaft 28 which fixedly mounts a collar 29 adjacent the center thereof. A pointer arm 32 is fixedly mounted on shaft 28 and extends forwardly therefrom and through the space between the housing wall and the side edge of scale 12. Pointer arm 32 terminates in a horizontal laterally bent tip 33 positioned in front of scale 12 adjacent the indicia thereof and rearwardly of transparent closure 11. A threaded rod 34 is fixedly secured to the collar 29 at one of its ends and extends therefrom in diametrically opposed relation to pointer arm 32, and on this rod 34 is threaded a suitable knurled nut 35 which forms an adjustable counterweight for the pointer arm 32.

The lever 27 is preferably of angle section, including vertical flange 36 for reinforcing the same. To the flange 36, adjacent the free end of said lever, is hooked the lower end of a coil spring 37. The upper end of said coil spring is hooked or otherwise connected to a stationary member spaced above said lever, as the anchor arm 38 projecting from one of the arms 16 of frame 14. Suitable means, such as ear 39, carried by the lever 27 opposite and below the point of engagement of spring 37 with said lever afford means for connecting the upper end of a second coil spring 40 to said lever. The two coil springs are preferably aligned, and the lower end of coil spring 40 is connected to suitable adjusting means. As here illustrated, this adjusting means comprises a member 41 which is slidably received and guided in a suitable opening in the base of frame 14. The member 41 is provided with a threaded bore into which the inner end of an adjusting screw 42 extends, said screw being threaded through the adjacent wall of housing 10 and terminating in a knurled head 43 positioned exteriorly of the housing. The upper end of member 41 includes a flange extension 44 to which the lower end of spring 40 is connected.

The two coil springs 37 and 40 are as nearly identical as possible. Thus care is used in selecting and pairing these springs to match the same as to all characteristics thereof, i. e. length, kind and gauge of wire, tension or strength, etc. By positioning the anchor arm 38 from the spring connection with lever 27, when the lever is in unactuated position, a distance approximately equal to the spacing between said lever and frame base 14, the springs 37 and 40, in assuming equally tensioned opposing relation, will position the lever 27 held therebetween at substantially "zero" position. In other words, the springs, in acting against each other, position the lever 27 in a neutral position when the lever is unactuated. However, should this neutral position be such that the pointer 32 does not indicate zero on scale 12, the position of member 41 connected with spring 40 may be adjusted by screw 42 to either increase or decrease the tension of both springs and at the same time adjust the neutral position of lever 27 in a manner to bring the pointer to desired neutral "zero" indicating position relative to the scale 12. When in neutral position, the springs 37 and 40 must obviously be sufficiently tensioned to permit the recoil of either a sufficient extent to accommodate movement of lever 27 in either direction to the full extent required for pivoting of pointer arm 32 to the maximum reading on scale 12, without in any way interfering with such lever movement. In other words, the normal length of each spring must be slightly less than the spacing between its connection points when the lever is actuated for its full range in the direction thereof. Thus, movement of lever 27 by its actuating member 17 tensions one spring and releases the other to the extent of the force applied, which induces a calibrated pointer movement relative to the scale. The scale indicia is calibrated in conformity with the spring calibration and compensated for the respective leverages of the pivoted members of the indicating mechanism. Upon release of this force, the spring tensions again act solely against each other and equalize, so that the pointer arm 32 is returned to "zero" position by the neutral positioning of the lever. Of particular importance in this construction is the fact that the use of opposed springs of the character mentioned insures return of the lever and pointer arm to exact neutral or "zero" position. In this connection, it has been found that instruments heretofore manufactured wherein the pointer actuator is otherwise spring controlled and calibrated, as by mounting thereof on a leaf spring, have the disadvantage that the pointer arm does not return accurately to "zero" position after use, and hence requires frequent adjustment of the calibrating spring. This is obviously avoided by the opposed spring arrangement above described. It will also be seen that if spring adjustment of the instant construction is required, the same is easy to effect by virtue of the position of the adjusting screw exteriorly of the instrument housing, and that the single adjusting means serves to tension both springs equally regardless of the extent of lever and pointer adjustment required to effect neutral setting of the pointer at "zero".

In order to provide a degree of accuracy of pointer adjustment and calibration greater than is practical by the construction above described, a pointer actuating means is provided to constitute a secondary calibration adjustor. Such greater degree of accuracy may also be rendered necessary by inability to pair together springs of exactly identical characteristics, with resultant need for compensation for the differences in the springs. For this purpose a rod 45 is fixedly mounted on shaft 28 and extends therefrom in substantially parallel relation to pointer arm 32. The free end portion of this rod is threaded to adjustably mount one part of suitable means for adjusting the position of the pointer arm relative to lever 27. As here illustrated, and best shown in Figs. 3 and 6, this adjusting means may comprise a cylindrical thumb screw 46 threaded on rod 45 and having an enlarged knurled collar 47. On the cylindrical body of thumb screw 46 is rotatably mounted a sleeve 48 which is held in place against movement longitudinally of said screw by flange 49. A rod 50 is pivotally connected to sleeve 48 at its upper end which may be of forked shape if desired. At its lower end the rod 50 is hooked or otherwise connected to flange 36 of lever 27 at any selected one of several spaced holes 51 in said flange. In the use of the device, assuming that approximate or close adjustment of the pointer arm has first been effected by means of screw 42, springs 37, 40 and associated parts as above described, the position of thumb screw 46 longitudinally of rod 45 is adjusted. By so doing, the angular relations of the rod 50 with respect to rod 45 and lever 27 are altered with resultant minute changes of spacing and angular position of said rod and pointer arm 32 relative to lever 27. The lever 27, being held in a neutral position by springs 37, 40, remains stationary so that only the pointer and rod 45 are moved, and a very fine degree of adjustment results. It will be understood, of course, that the most accurate adjustment will result when the thumb screw 42 is adjusted before the secondary adjustment through thumb screw 46 is made. In other words, the adjustment of the pointer arm is best used only for those fine adjustments of pointer position which are impossible to obtain through thumb screw 42.

While only one embodiment of the invention has been herein illustrated and described, it will be obvious that the invention may also be embodied in a large number of other instruments of different types and constructions. In all such embodiments the opposed tension springs calibrate the indicator actuating means, and the position of the indicator may be adjusted by a single control member. It is evident, however, that there may occur certain requirements which will render necessary the use of opposed springs which are not equal, as in length or tension, in which case the invention may nevertheless be employed by the use of springs which are selected for their required relative characteristics. It will also be understood that other embodiments than that here illustrated may also include the minute secondary adjustment of the indicator relative to the operating or actuating means thereof.

We claim:

1. The combination with an instrument having a housing, and an operating unit in said housing including a stationary frame, an indicator shiftably mounted on said frame, a force responsive member mounted on said frame, a movable member, actuated by said force responsive member, and a link connecting said movable member and indicator, of a spring connected to said frame and acting on said member, an anchor adjustable relative to said housing, and a second spring connected to said anchor and acting on said member in opposition to said first spring, said springs, being of equal strength and serving to calibrate said unit and adjust the normal inoperative position of the indicator and force responsive member.

2. The combination with an instrument having a pivoted indicator and actuating means therefor including a shiftable member and a link pivoted to said shiftable member and connected to said indicator, of means for adjusting the normal position of said indicator and actuating member and including a pair of tension springs acting on said member in opposed relation and means for varying the tension of said springs, and means for shifting the point of connection of said link and indicator to adjust the position of said indicator relative to said member.

3. The combination with an instrument having a pivoted indicator, pressure responsive means, a shiftable member actuable by said means and a link between said member and indicator, of a pair of tension springs acting on said member in opposed relation, means for adjusting the tension of said springs to adjust the position of said member and indicator, and means for varying the normal angular position of said link to adjust the position of said indicator relative to said shiftable member.

4. The combination with an instrument having a pivoted indicator and actuating means including an elongated shiftable member having a free end and a link between the free end of said member and said indicator, of means for calibrating said indicator comprising a pair of springs of substantially equal strength acting upon said member in opposed relation, means for adjusting the tension of said springs to adjust the normal position of said indicator, and means for adjusting said link to compensate for inequalities in the strength of said springs.

HANS LINDE.
ARNOLD SOLLER.